(12) United States Patent
Puhl

(10) Patent No.: US 7,475,737 B2
(45) Date of Patent: Jan. 13, 2009

(54) HOOF PLATE

(76) Inventor: Michael Puhl, Prof.-Peter-Wust-Strasse 32a, D-66679 Losheim am See (DE)

( * ) Notice: Subject to any disclaimer, the term of this patent is extended or adjusted under 35 U.S.C. 154(b) by 0 days.

(21) Appl. No.: 11/606,516

(22) Filed: Nov. 30, 2006

(65) Prior Publication Data
US 2007/0125555 A1    Jun. 7, 2007

(30) Foreign Application Priority Data
Dec. 2, 2005    (DE)    .................... 10 2005 057 783

(51) Int. Cl.
A01L 5/00    (2006.01)
A01L 7/02    (2006.01)
(52) U.S. Cl. ......................... 168/28; 168/14
(58) Field of Classification Search ................ 168/12, 168/13, 16, 4, 26, 14
See application file for complete search history.

(56) References Cited

U.S. PATENT DOCUMENTS

| 460,459 | A | * | 9/1891 | Borrett | 168/28 |
|---|---|---|---|---|---|
| 461,160 | A | * | 10/1891 | Meitzler | 168/28 |
| D29,713 | S | * | 11/1898 | Davie | D30/149 |
| D30,482 | S | * | 4/1899 | Badgley | D30/149 |
| 660,427 | A | * | 10/1900 | Hallanan | 168/28 |
| 683,450 | A | * | 10/1901 | Ehlers | 168/28 |
| 684,935 | A | * | 10/1901 | Hirsch | 168/14 |
| 706,768 | A | * | 8/1902 | Marcley | 168/28 |
| 710,999 | A | * | 10/1902 | Powers | 168/28 |
| 909,287 | A | * | 1/1909 | Dillon | 168/14 |
| 1,057,222 | A | * | 3/1913 | Conroy | 168/28 |
| 1,198,927 | A | * | 9/1916 | Kempshall | 168/28 |
| 1,496,622 | A | * | 6/1924 | Cahill | 168/26 |
| 5,706,898 | A | * | 1/1998 | Beadle | 168/28 |
| 6,672,395 | B1 | | 1/2004 | Ovnicek | |
| 7,178,321 | B2 | * | 2/2007 | Ruetenik | 54/82 |

FOREIGN PATENT DOCUMENTS

| DE | 37 591 | 11/1886 |
|---|---|---|
| DE | 2006/134268 | 12/2006 |
| GB | 202 528 | 8/1923 |
| GB | 254 386 | 7/1926 |

* cited by examiner

*Primary Examiner*—Son T. Nguyen
(74) *Attorney, Agent, or Firm*—Friedrich Kueffner

(57) ABSTRACT

The invention relates to a hoof plate, especially made of a soft material, for orthopedic shoeing, having a plate surface (19) facing the hoof and a plate surface (20) facing away from the hoof. According to the invention, in the plate surface (19) facing the hoof there is formed an indentation (4) for the reception of the frog. Preferably, the plate surface (20) facing away from the hoof has a projection (13) complementary to the indentation.

15 Claims, 2 Drawing Sheets

HOOF PLATE

BACKGROUND OF THE INVENTION

1. Field of the Invention

The invention relates to a hoof plate, especially made of a soft material, for orthopedic shoeing, having a plate surface facing the hoof and a plate surface facing away from the hoof.

2. Description of the Related Art

Such, where necessary slightly wedge-shaped hoof plates for arrangement between hoof and horseshoe, which consist of rubber, are known through use. They serve, in particular, for the protection of the hoof sole and frog, for the height adjustment of the hoof or for the correction of the hoof axis and are used both therapeutically and prophylactically.

SUMMARY OF THE INVENTION

The object of the invention is to improve the orthopedic treatment of hoofed animals, especially horses, through the use of such hoof plates.

The hoof plate according to the invention which achieves this object is characterized in that in the plate surface facing the hoof there is formed an indentation for the reception of the frog.

Contusions of the frog as occur in conventional hoof plates, particularly when the frog, after a wall shortening, projects beyond the edge of the horn of the hoof, are advantageously avoided.

In accordance with the arrangement of the frog, the indentation, in a preferred embodiment of the invention, is disposed adjacent to the rear rim of the hoof plate.

Expediently, the indentation is configured symmetrical to an axis running from front to back, this preferably constituting the center axis of the hoof plate.

Expediently, in further adaptation to the anatomy of the frog, the rim of the indentation is configured roughly in the shape of an acute isosceles triangle, the apex of which points to the front rim of the hoof plate. Preferably, the depth steadily decreases in the direction of the apex of the triangle and the indentation tapers out at the apex of the triangle in the plate surface, i.e. it merges seamlessly into the plate surface.

That side of the indentation which borders on the rear rim of the hoof plate is arched outward in line with the hoof anatomy. This side is shorter than the two equal-length sides of the triangle.

For many applications, it has proved expedient if the triangular apex of the indentation reaches out beyond the middle of the plate and extends, in particular, forward from the rear rim over about ⅔ of the plate length.

Preferably, the floor of the indentation has in cross section perpendicular to the center axis a wave form, the floor firstly sloping down to both sides from a floor elevation in the middle of the indentation and then climbing back up to the respective rim of the indentation.

On the equal-length triangular sides of the indentation, step-like recesses can be formed, which can stabilize and fix a hoof pad filling inserted between plate and hoof. The stabilization and fixing of a hoof pad filling are additionally served by transverse webs which extend within the indentation perpendicular to the center axis and are disposed, in particular, within the last third of the indentation bordering on the rear rim of the plate.

Expediently, the height of the transverse webs is half as large as the respective depth of the indentation at the site of the web.

In a further embodiment of the invention, the plate surface facing away from the hoof has a projection which, in the region of the frog, ensures contact with the floor and thus an optimal support of the hoof against the floor.

Preferably, the projection is formed complementary to the indentation, i.e. it lies precisely opposite the indentation on the other plate side. Shape and dimensions correspond to the floor of the indentation.

The plate surfaces can be parallel or angled relative to each other. In the latter case, the plate thickness decreases from the rear rim to the front rim.

In the case of a wedge-shaped hoof plate, in particular, in its plate surface facing away from the hoof a heart-shaped indentation is expediently formed symmetrical to the center axis, into which the tip of said projection extends, the apex of the heart pointing in the same direction as the tip of the projection. Preferably, the depth steadily decreases from back to front and the heart-shaped indentation merges at the apex of the heart seamlessly into the plane plate surface.

In a further embodiment of the invention, the plate surface facing the hoof can be structured, at least in a front portion, this structuring increasing the frictional resistance between plate and hoof and deterring displacements of the plate on the hoof.

Expediently, the hoof plate is of roughly square configuration, with rounded corners.

BRIEF DESCRIPTION OF THE DRAWING

The invention is explained in greater detail below with reference to illustrative embodiments and the appended drawings relating to these illustrative embodiments, wherein.

Figure 1:
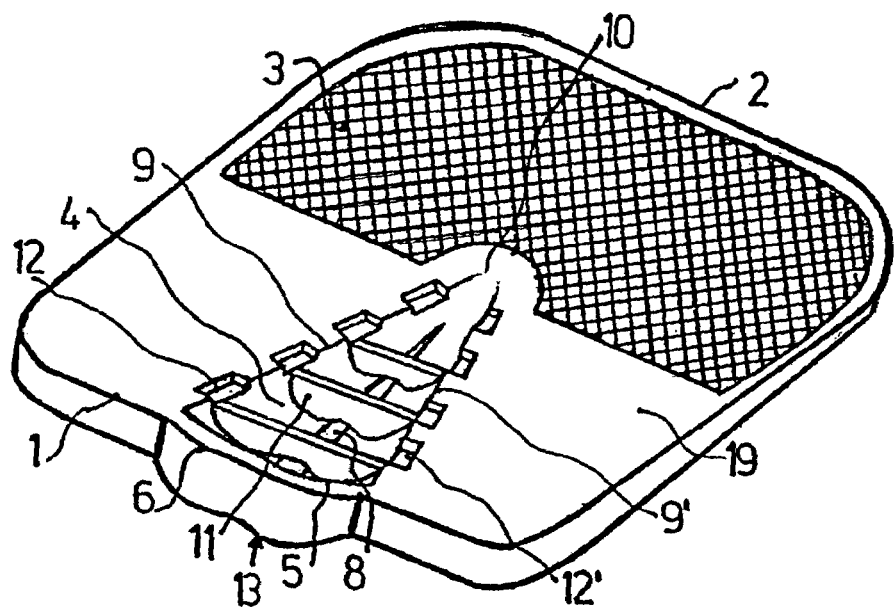
FIG. 1 shows a hoof plate according to the invention in a view obliquely from above of the plate side facing the hoof.
Figure 2:
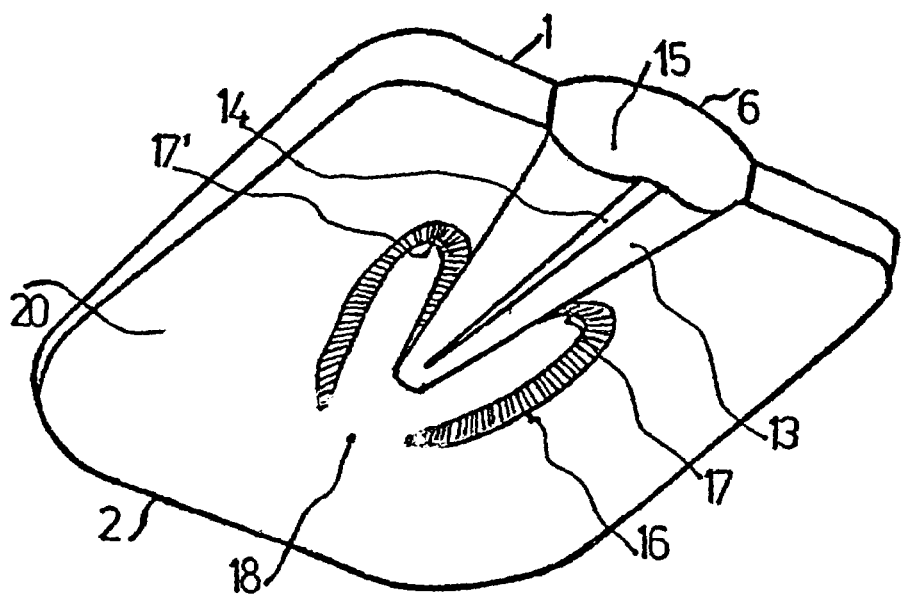
FIG. 2 shows the hoof plate of FIG. 1 in a view obliquely from below of the plate side facing away from the hoof.

A roughly square hoof plate having rounded corners, which is made of rubber, for example, and is shown in FIGS. 1 and 2, is essentially wedge-shaped, the plate thickness decreasing from the rear plate rim 1 to the front plate rim 2.

DETAILED DESCRIPTION OF THE INVENTION

In the front part of a hoof-facing plate surface 19, a scale-like pattern 3 is imprinted as a surface structuring.

Figure 3:
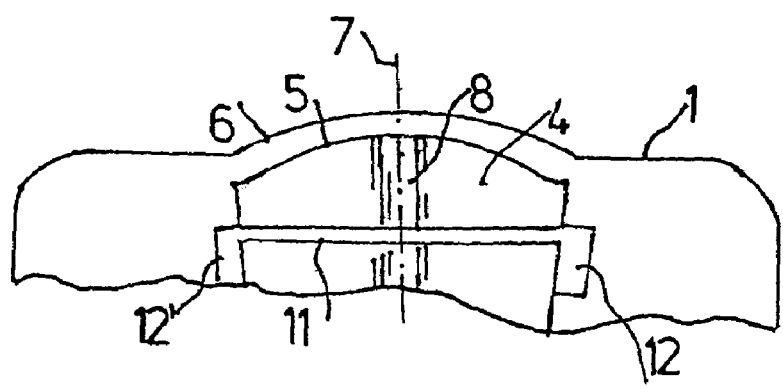
FIG. 3 is a part-view of the hoof plate of FIGS. 1 and 2 in a top view of the rear part of the plate side facing the hoof.

The hoof plate symmetrical to a center axis 7 running from front to back and represented in FIG. 3 has on the hoof-facing side an indentation 4 having an apertural rim roughly in the shape of an isosceles triangle. A short, slightly convexly curved triangular side 5 borders on a portion 6 of the rear plate rim 1 which projects outward as a circular segment.

As can be seen from FIG. 1, the floor of the indentation 4 has in cross sections perpendicular to the center axis 7 a wave form. From a floor elevation 8 extending from front to rear in the middle of the indentation 4, the floor firstly slopes down to both sides and then climbs back up to the long triangular side 9 or 9' of the indentation 4.

Toward the front end, the indentation 4 becomes steadily flatter and merges at the triangular apex 10 into the plane surface of the hoof-facing plate side.

Within the indentation there are additionally disposed three transverse webs 11, which extend perpendicular to the center axis 7 and are connected to the floor of the indentation 4. In the shown illustrative embodiment, the heights of the webs correspond to about half the respective maximum depth of the indentation 4.

As further shown by FIG. 1, on the long triangular sides 9 and 9' of the apertural rim of the indentation 4 there are respectively formed four stepped recesses 12 and 12'. The floor of the stepped recesses 12 and 12' tapers out flush with the free rim of the adjacent transverse webs 11.

Corresponding to the indentation 4 on the hoof-facing plate surface 19 of the hoof plate is a projection 13 on its plate surface 20 facing away from the hoof. Accordingly, the marginal limits of the projection 13 form roughly an isosceles triangle and the projection has in the middle a trough-like indentation 14 extending along the center axis 7 roughly over the entire length of the projection 13.

The rear end of the projection 13 is limited by a surface 15, which is convexly arched in accordance with the curve of the plate rim portion 6 and stands roughly perpendicular on the plate surfaces 19 and 20.

The pointed front end of the projection 13 extends into a roughly heart-shaped indentation 16, the deepest point of which is situated at 17 and 17'. In the frontal direction, the indentation becomes steadily flatter and merges at 18 seamlessly into the plane plate surface 20 facing away from the hoof.

Advantageously, the indentation 4 offers space for the reception of the frog. When, in particular, the plate is attached to the hoof after a wall shortening, contusions do not therefore arise in the region of the frog. The shape of the indentation, including its bulge at its rear end, is matched to the shape of the frog.

The transverse webs 9 fix and stabilize the hoof pad filling to be inserted between hoof and plate. The same purpose is served by the recesses 12 and 12'.

The projection 13 advantageously secures a contact of the hoof with the floor in the frog region and thus ensures a relief of load more even pressure distribution and of the hoof.

At variance with the shown illustrative embodiment, the triangular apex 10 could approach closer to the front rim 2 and the indentation 4 could extend, for example, over ⅔ of the plate length.

Figure 4:
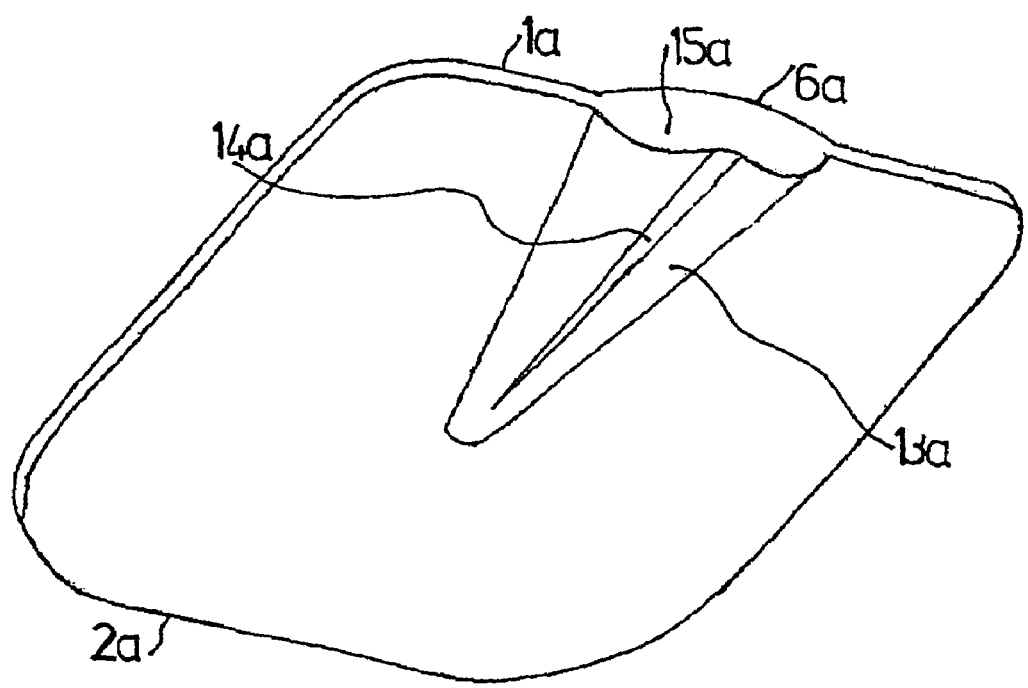
FIG. 4 shows a second illustrative embodiment of a hoof plate according to the invention in a view obliquely from below of the plate side facing away from the hoof.

As is evident from FIG. 4, in accordance with another embodiment, the hoof plate may also be formed without the heart-shaped indentation 16 on the side of the plate facing the hoof. In this embodiment, the thickness of the plate is constant from the rear plate rim 1a to the front plate rim 2a and the plate surfaces extend parallel to each other. A projection 13a and a trough-like indentation 14a are formed as in the embodiment of FIG. 2. A protruding section 6a with a surface 15a has a lower height as compared to the plate according to FIG. 2 so as to correspond to the smaller thickness of the plate as compared to the plate of FIG. 2.

The invention claimed is:

1. Hoof plate, of a soft material, for orthopedic shoeing, the hoof plate comprising a plate surface (19) facing the hoof and a plate surface (20) facing away from the hoof, wherein the plate surface (19) facing the hoof has an indentation (4) for the reception of the frog, and wherein the indentation (4) is disposed adjacent to a rear rim (1) of the hoof plate, wherein the depth of the indentation (4) steadily decreases from back to front, wherein the indentation (4) is configured symmetrical to an axis running from front to back along a center axis (7) of the hoof plate, and wherein transverse webs (11) perpendicular to the axis (7) are disposed in the indentation (4) within that third of the indentation (4) which is facing the rear rim (1).

2. Hoof plate according to claim 1, wherein the rim of the indentation (4) has a rim having roughly the shape of an acute isosceles triangle, wherein an apex of the triangle points to a front rim (2) of the hoof plate and whose side (5) adjacent to a rear rim (1) is shorter than the two equal-length sides (9, 9') of the triangle.

3. Hoof plate according to claim 2, wherein the triangular apex (10) of the indentation (4) reaches out beyond the middle of the plate and the indentation (4) extends forward from the rear rim (1) over ⅔ of the plate length.

4. Hoof plate according to claim 2, wherein, on the equal-length triangular sides (9, 9') of the indentation (4), step-like recesses (12, 12') are formed.

5. Hoof plate according to claim 1, wherein a side (5) of the indentation (4) which borders on the rear rim (1) of the hoof plate is arched outward.

6. Hoof plate according to claim 1, wherein the indentation (4) merges at the front end (10) without a rim into the plate surface (19).

7. Hoof plate according to claim 1, wherein the floor of the indentation (4) has in cross section perpendicular to the center axis (7) a wave form and, from a floor elevation (8) in the middle of the indentation (4), firstly slopes down to both sides and then climbs back up to the rim (9, 9') of the indentation (4).

8. Hoof plate according to claim 1, wherein the height of the transverse webs (11) is half as large as the respective depth of the indentation (4)

9. Hoof plate according to claim 1, wherein the plate surface (20) facing away from the hoof has a projection (13).

10. Hoof plate according to claim 9, wherein the projection (13) is configured complementary to the indentation (4).

11. Hoof plate according to claim 1, wherein the plate surfaces (19, 20) extend at an angle relative to each other, with the plate thickness decreasing from the rear rim (1) to the front rim (2).

12. Hoof plate according to claim 11, wherein the plate, in its plate surface (20) facing away from the hoof, has a heart-shaped indentation (16), into which a tip of the projection (13) extends, the apex of the heart pointing in the same direction as the tip of the projection (13).

13. Hoof plate according to claim 12, wherein the depth of the indentation (16) steadily diminishes from back to front and the indentation (16) merges in the apex of the heart without a rim into the plate surface (20).

14. Hoof plate according to claim 1, wherein the plate surface (19) facing the hoof is structured, at least in a front portion.

15. Hoof plate according to claim 1, wherein the plate is of roughly square configuration, with rounded corners.

* * * * *